POWERS & STEVENS.
Cane Mill.
No. 69,244.
2 Sheets—Sheet 1.
Patented Sept. 24, 1867.
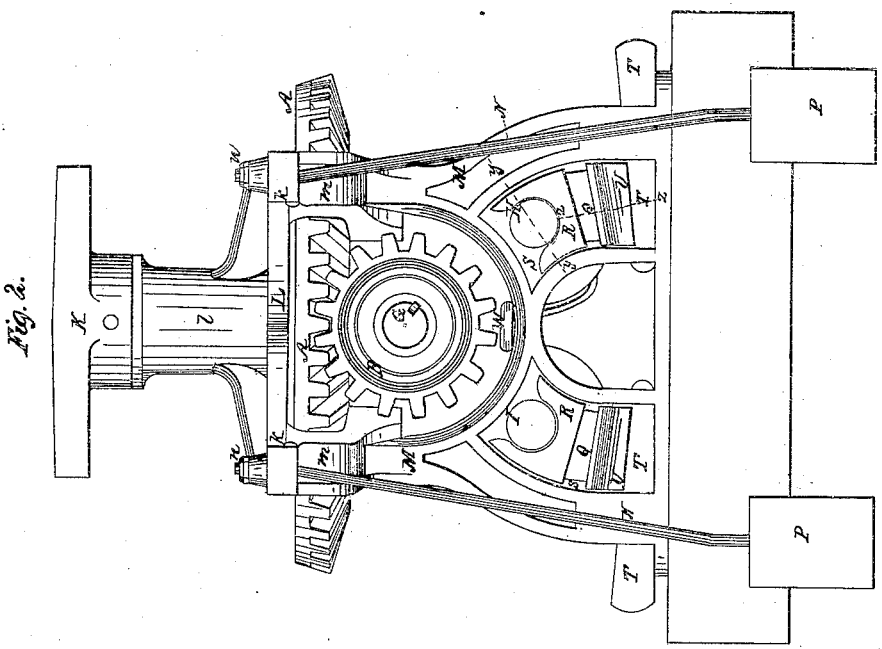
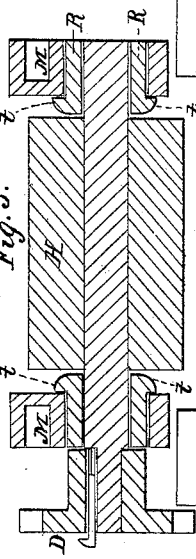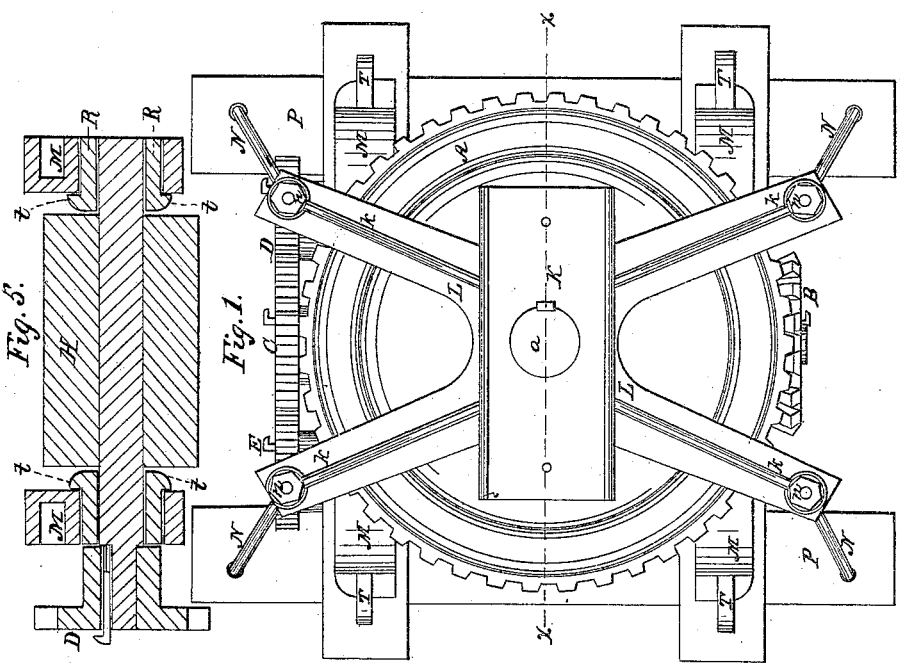

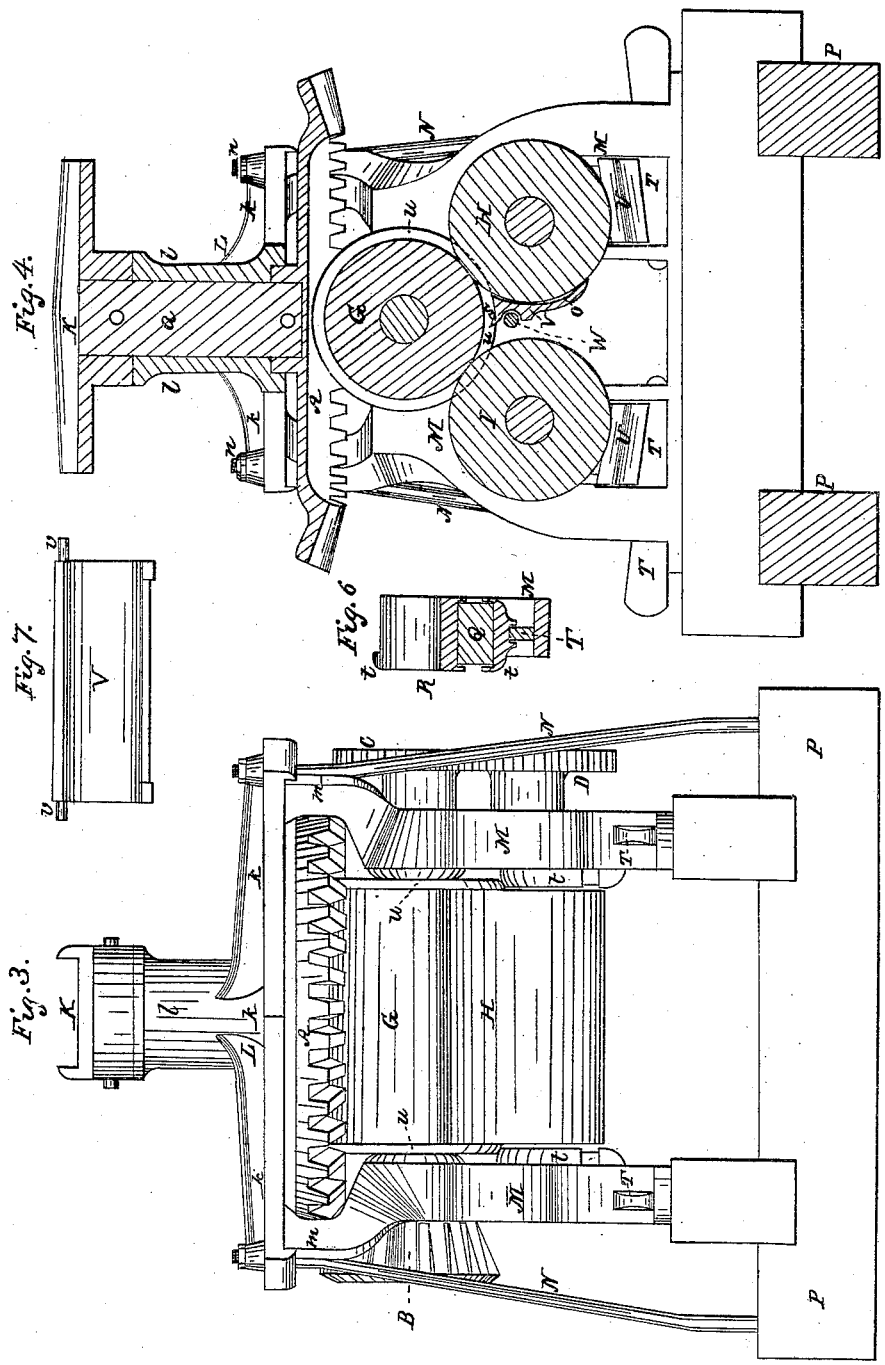

United States Patent Office.

D. J. POWERS, OF MADISON, WISCONSIN, AND HENRY B. STEVENS, OF BUFFALO, NEW YORK, ASSIGNORS TO BUFFALO AGRICULTURAL MACHINE WORKS.

*Letters Patent No. 69,244, dated September 24, 1867.*

IMPROVEMENT IN SUGAR-CANE MILLS.

The Schedule referred to in these Letters Patent and making part of the same.

TO ALL WHOM IT MAY CONCERN:

Be it known that we, D. J. POWERS, of Madison, in the county of Dane, and State of Wisconsin, and HENRY B. STEVENS, of Buffalo, in the county of Erie, and State of New York, have invented an improved Cane-Mill or Crusher; and we do hereby declare that the following is a full and exact description thereof, reference being had to the accompanying drawings making part of this specification—

Figure 1 being a plan of the mill.
Figure 2, an end elevation thereof.
Figure 3, a side elevation thereof.
Figure 4, a vertical section of the same, in a plane indicated by the line $x\ x$, fig. 1.
Figure 5, a section in a plane indicated by the line $y\ y$, fig. 2.
Figure 6, a section in a plane indicated by the line $z\ z$, fig. 2.
Figure 7, a side view of the scraper or turn-plate.

Like letters designate corresponding parts in all of the figures.

Our improvements are upon that class of cane-crushers known as horizontal-sweep cane-mills, in which the crushing and pressing-rollers are situated horizontally, and a main driving-wheel placed directly over the rollers, to be driven by a sweep or sweeps, moved by horses travelling around the mill. In order to communicate the motion from this horizontal driving-wheel to the horizontal rollers, the most practical means is by bevel gear. Thus a large bevel driving-wheel, turning upon a fixed pivot, has been employed; and this gears into a bevel-pinion on the shaft of one journal of the upper roller, while a spur-wheel on the other journal of this roller gears into the two spur-wheels of the two lower rollers. Upon a driving-shaft and pivot, so arranged, a very great strain is exerted, rendering the pivot liable to be broken or loosened, or allowing the wheel to wabble in running. Heretofore the wheel pivot has had nothing to sustain or steady its upper end, since it simply projected upward from a top plate or bridge-tree situated over the rollers.

Our improvement in this part of the mill consists in hanging or supporting the driving-wheel A under a bridge-tree L, which is secured to the housings M M of the mill, outside of and immediately over the wheel; the said bridge-tree having cast or bolted upon it a bearing, $l$, of suitable length, to receive the driving-shaft $a$, which extends up through it, and has the driving-wheel attached at its lower end, below the bearing, and the sweep or sweeps secured to it above the bearing. The sweep-socket K rests and rides upon the bearings of the bridge-tree. This arrangement of the driving-wheel below the bridge-tree, and between the framework or housings of the mill, is found to obviate many serious difficulties encountered in the old plan of placing the driving-wheel above and outside of the framework, where it is much more liable to breakage, as above indicated, and generally to disarrangement, both in use and transportation. Besides, an equal amount of material in construction affords much greater strength and durability. Therefore economy, durability, and compactness are obtained by this construction.

In connection with the arrangement of the driving-wheel A below the bridge-tree, and between the housings of the mill, our next improvement consists in placing the bevel-pinion B, into which the driving-wheel A gears, and which transmits the power to the upper roller G, outside of the housing of the mill, so that it is separate from the rollers, and does not interfere with nor entangle the canes. We wish it to be understood that we do not claim, in general terms, placing the pinion outside of the housing or frame, as that is common. But when the driving-wheel was placed inside of the framework, it was a desideratum to still locate the pinion B outside of the housing, and it was not easy to accomplish this without detriment to or disarrangement of the framework of the mill. We have accomplished this purpose, and at the same time rendered the framework of the mill strong, very compact, comparatively light, and made the whole mill convenient and of good appearance. To effect the purpose, we extend arms $m\ m$ outward, or outward and upward, from each or at least one housing or side frame M, beyond the planes of the said housing, sufficiently to allow the periphery of the driving-wheel A to project between the arms, over the housing, far enough to gear into the pinion B outside of said housing. Then, upon the projecting arms $m\ m$ of the housings, the arms or flanches $k\ k$ of the bridge-tree L are bolted or otherwise secured, substantially as represented, or in an equivalent way, so that the bridge-tree is firmly supported thereby. These arms $m\ m$ are represented as cast with their housings, but they may be formed separately, and bolted or otherwise secured thereto; or they might project from the arms or flanches k k of the bridge-tree L, or be formed partly on the bridge-tree and partly on the housings. The method substantially as represented is not only convenient and otherwise suitable, but it enables us to more readily apply an additional feature of improvement as follows:

We employ long stay-bolts N N, one for each arm m of the housings, not only to connect the arms or flanches of the bridge-tree to the said arms of the housings, but to secure the whole iron structure of the mill down upon the wooden foundation. As represented, these stay-bolts extend up through the timbers P P of the foundation, (held by heads, or equivalent, at the bottom,) and thence up through the arms m m and k k, above which they are secured and tightened by nuts n n. These are the only bolts or rods used to connect the framework of the mill, and they render the whole firm and strong. They enable the lower part of the housings to be made much lighter than they otherwise would have to be, and keep all in place, so that cheapness as well as strength is attained.

Our next improvement consists in an improved application of the rubber springs, as applied to this class of cane-mills. Since the upper roller first receives and transmits the power, it is desirable that this roller should remain stationary, and for the lower rollers H I to yield and be adjustable thereto. The rubber springs Q Q are arranged beneath the bearing-boxes R R, which support the journals of the lower rollers. We find that the elastic forces of those springs are best applied by arranging them and the said bearings in curved or arc-shaped slots or ways S S, in the housings, the curves having a common centre under the middle of the housings, substantially as represented, and the direction in which the bearings first or ordinarily yield, being nearly in lines from the centre of the upper roller G, through the centres of the lower rollers H I respectively. And while thus the direction of the pressure is as it should be, we are enabled to adjust the springs and bearing-boxes by means of keys or wedges T T, driven under saddle-pieces U U, on which the springs rest, and which move in the curved slots or ways S S, in directions more nearly vertical than the bearing-boxes themselves, and so as to just suit the position and form of the keys. These keys are a simple, strong, and perfectly reliable means of adjusting the springs and bearing-boxes. The yielding adjustment of the rollers H I in this way does not interfere with the matching of the spur gear-wheels C D E upon the shafts or journals of the respective rollers for transmitting the motion from the upper roller to the lower rollers; and while thus separating the lower rollers but slightly, the scraper is more easily kept in contact with the lower feed-roller. The rubber springs themselves are wedge-shaped, or thicker at the outer than at the inner ends, so that their upper and lower surfaces point to the common centre of the curved ways.

We find that this arrangement of the bearings and springs causes the pressure of the rollers to bear evenly on the bearings R R, so that they neither turn nor wedge in position, nor crowd at their inner edges against the sides of the slots or ways, as is the case when the ways are straight.

The bearing-boxes R R are inserted into their slots or ways S S from the inside of the housings, and have flanges or projections t t, figs. 5 and 6, on their inner edges to prevent their working outward from place. The rollers H I, abutting against the bearing-boxes, prevent their working inward out of place. They thus require no previous fitting, after being cast, and yet move freely in place. By our arrangement of the bearings and springs, both of the under rollers are separately adjustable, and each end of each roller is adjustable, and yields independent of the other.

Our last improvement consists in a self-adjusting scraper or turn-plate, V, so arranged as to adapt itself to and keep parallel with the lower, front, or feed-roller H, however much or irregularly it yields and departs from its parallel position. We do not claim self-adjusting scrapers or turn-plates in other ways, as such have been used a long time in this and other countries in various forms. But hitherto all attempts to apply a self-adjusting scraper to the front, lower, or feed-roller, when the latter is adjustable and yielding, have failed on account of the continually varying positions of the rollers in yielding more at one than at the other end. The proper or principal office of the scraper or turn-plate is to receive the cane after passing through between the upper roller and first lower or feed-roller, and direct the ends thereof upward between the upper roller and next lower or discharge-roller, and thus prevent any stalks from taking a wrong direction downward between the two lower rollers. As turn-plates are usually constructed, they are only capable of self-adjustment around their axes, so that if the front lower roller yields more at one end than the other, the turn-plate cannot follow it, because the other end of the roller will not permit, and thus a space is opened between the scraper and most depressed end of the roller, so as to allow cane-stalks to enter therein and clog the mill.

Our improved turn-plate is suspended on or by a rod, W, which extends through the housings, and lengthwise through or by the side of the scraper or turn-plate, in a groove or aperture, S, so widened or enlarged vertically that while the turn-plate is suspended between the rod and the roller H, by the widened or wedge-like form of the portion of the plate between these surfaces and above the rod, yet when either end of the roller is depressed, the rod will have free play in the groove or aperture, and allow the turn-plate to follow the roller, and adhere to it throughout its length. It is not essential that the rod should pass through the turn-plate or any part of it, since the turn-plate is supported between the rod and the rollers. A single rod, or one at each end, may be used. In order to keep the turn-plate in the proper position with this free movement, there should be a projecting wing or guides, v, extending downward, and keeping in contact with the roller, touching it at the lower edge or ends, but not in the middle part, as represented. By means of the rod W, which is inserted through the housings from the outside, and through or by the turn-plate, the latter may readily be removed, dropping down between the two lower rollers on withdrawing the rod, and may be again inserted in the same way without taking the mill to pieces or disturbing any part thereof. This is a great convenience, since it is often necessary to remove the turn-plate. There are projections v v at the ends of the turn-plate to keep the same in a central position, and not allow it to come in contact with the flanges $u$ $u$, on the end of the roller G.

What we claim as our invention, and desire to secure by Letters Patent, is—

1. Locating the driving-wheel A beneath the bridge-tree L, and between the housings or side frames M M, substantially as and for the purpose herein specified.

2. In combination with the location of the driving-wheel under the bridge-tree, as above, we also claim the location of the pinion B outside of the housing or side frame M, for the purpose set forth.

3. We also claim the arrangement of the wedges T T, and saddle-pieces U U, for adjusting the springs Q Q, and bearings or journal-boxes R R, of the lower or minor rollers, substantially as herein set forth.

4. We also claim the scraper, or turn-plate V, constructed and arranged so as to self-adjust itself to the position or positions of the lower feed-roller H, substantially as herein specified.

The above specification of our improved cane or sorghum-mill signed by us in presence of subscribing witnesses.

D. J. POWERS,
HENRY B. STEVENS.

Witnesses:
JOHN S. HAWKS,
GEO. M. MARSH, } as to D. J. POWERS.

Witnesses:
J. S. BROWN,
J. FRASER, } as to H. B. STEVENS.